(12) United States Patent
Lewis et al.

(10) Patent No.: US 6,738,635 B1
(45) Date of Patent: May 18, 2004

(54) WIRELESS SCHEDULE NOTIFICATION METHOD AND SYSTEM

(75) Inventors: John E. Lewis, Lawrenceville, GA (US); Donald M. Cardina, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 503 days.

(21) Appl. No.: 09/666,710

(22) Filed: Sep. 21, 2000

(51) Int. Cl.⁷ .............................................. H04Q 7/20
(52) U.S. Cl. .................. 455/466; 455/412.1; 455/412.2
(58) Field of Search ............................... 455/466, 403, 455/412.1, 412.2, 413.3, 414.1, 414.2, 414.3, 414.4, 415, 418, 419, 420; 370/395.4

(56) References Cited

U.S. PATENT DOCUMENTS

| | | | | |
|---|---|---|---|---|
| 5,440,559 A | * | 8/1995 | Gaskill | 370/314 |
| 5,678,196 A | * | 10/1997 | Doyle | 455/466 |
| 5,742,905 A | * | 4/1998 | Pepe et al. | 455/461 |
| 5,787,090 A | * | 7/1998 | Van Niekerk et al. | 370/522 |
| 6,108,534 A | * | 8/2000 | Bourgeois et al. | 455/419 |
| 6,308,061 B1 | * | 10/2001 | Criss et al. | 455/418 |
| 6,430,409 B1 | * | 8/2002 | Rossmann | 455/422.1 |

* cited by examiner

Primary Examiner—Cong Van Tran
(74) Attorney, Agent, or Firm—Kirkpatrick & Lockhart LLP

(57) ABSTRACT

A wireless schedule notification method is disclosed. The method comprises retrieving user defined event related data from a storage device, and transferring data to a wireless communication device at a predetermined time prior to the time indicated by the data. A schedule data transfer system is also provided. The schedule data transfer system includes a storage device containing computer readable data representing a user defined scheduled time of an event and a processor containing instructions. When the processor executes the instructions, the processor retrieves schedule data from the storage device and transfers data to a wireless communication device. A computer readable medium having stored thereon instructions which, when executed by a processor, cause the processor to retrieve user defined schedule data from a storage device, the data including a time at which an event is scheduled to take place, and transfer at least a portion of the scheduled data to a wireless communication device at a predetermined time prior to the time at which the event is scheduled to take place is also provided.

49 Claims, 6 Drawing Sheets

WIRELESS SCHEDULE NOTIFICATION METHOD AND SYSTEM

CROSS-REFERENCE TO RELATED APPLICATIONS

Not Applicable.

FEDERALLY SPONSORED RESEARCH

Not Applicable.

BACKGROUND

1. Field of the Invention

The present invention relates to the transfer of information to a wireless communication device and, more particularly, to transferring information from a schedule program to a wireless communication device.

2. Description of the Invention Background

It is commonly known that processors may communicate with wireless communication devices. Such processors may include, for example, a mainframe computer, a mini-computer, a micro-computer, a personal computer having, for example, a MICROSOFT® or APPLE® operating system and a data storage device, or another device that is capable of storing and manipulating data. Such a processor may be connected to a public switched telephone network (PSTN) to provide connectivity with other devices. In addition, wireless networks are commonly used to accommodate communication between the PSTN and wireless communication devices. Such wireless networks include analog networks and digital networks utilizing any form of wireless technology including, for example, CDMA and/or TDMA, and any other radio network that employs intersystem messaging such as an IS-41 (Interim Standard-41) based system, for example. Wireless communication devices that are capable of receiving and sending data, as well as voice communication, are also commonly used in such a wireless network. Digital and analog cellular telephones are common examples of such wireless communication devices.

Processors that may be connected to or in communication with such a wireless network 10 commonly use scheduling programs for organizing activities based on the time the activity is to occur and for storing information related to those activities for future use. Commonly used scheduling programs include MICROSOFT SCHEDULE+®, for example. While portable processors that employ such schedule programs are available, it would be beneficial to have scheduling for one or more persons occur at one stationary location. It would also be beneficial for a person carrying only a wireless communication device to be automatically notified of upcoming scheduled events stored within a remote processor and be provided with data related to those scheduled events by way of the wireless communication device.

Thus, a need exists for an apparatus and method for accessing data related to a scheduled event that is stored in a processor and for sending that data to a wireless communication device.

A further need exists for communicating data relating to a scheduled event at a time prior to the scheduled time of the event.

SUMMARY

In accordance with one embodiment of the present invention, there is provided a wireless schedule notification method. The method comprises retrieving user defined event related data from a storage device, and transferring data to a wireless communication device at a predetermined time prior to the time indicated by the data.

A schedule data transfer system is also provided. The schedule data transfer system includes a storage device containing computer readable data representing a user defined scheduled time of an event and a processor containing instructions. When the instructions are executed by the processor, the processor retrieves schedule data from the storage device and transfers data to a wireless communication device. Another schedule data transfer system includes a server, a computer readable medium containing user defined schedule data, a processor communicating with the server and the computer readable medium, and a wireless communication device in communication with the server. In that system, the processor contains instructions that, when executed, cause the processor to transfer the user defined schedule data from the computer readable medium to the server, and the wireless communication device receives the schedule data from the server.

A computer readable medium having stored thereon instructions which, when executed by a processor, cause the processor to retrieve user defined schedule data from a storage device, the data including a time at which an event is scheduled to take place, and transfer at least a portion of the user defined schedule data to a wireless communication device at a predetermined time prior to the time at which the event is scheduled to take place is also provided.

Thus, the present invention offers the feature of accessing user defined event related data and sending data related to that data to a wireless communication device.

Another feature of the present invention is that it provides the user defined event related data to the wireless device at a predetermined time prior to the scheduled time of the event such that the user of the wireless device may be informed that an event is scheduled to take place in the future.

The present invention may also beneficially provide event related data to the wireless device to provide the user of the wireless device with information related to the scheduled event. Accordingly, the present invention provides solutions to the shortcomings of prior wireless scheduling systems and methods. Those of ordinary skill in the art will readily appreciate, therefore, that these and other details, features and advantages will become further apparent in the following detailed description of the preferred embodiments.

These and various other features of novelty as well as advantages which characterize the invention are pointed out with particularity in the claims annexed hereto and form a part hereof. However, for a better understanding of the claimed invention reference should be made to the drawings which form a part hereof, and to the accompanying descriptive matter, in which there are illustrated and described specific examples of the claimed invention.

BRIEF DESCRIPTION OF THE DRAWINGS

In the accompanying Figures, there are shown present embodiments of the invention wherein like reference numerals are employed to designate like parts and wherein.

DETAILED DESCRIPTION

It is to be understood that the Figures and descriptions of the present invention included herein illustrate and describe elements that are of particular relevance to the present invention, while eliminating, for purposes of clarity, other elements found in conventional processors, wireless communication devices, and communication networks. Because the construction and implementation of such other elements are well known in the art, and because a discussion of them would not facilitate a better understanding of the present invention, a discussion of those elements is not provided herein. It is also to be understood that the embodiments of the present invention that are described herein are illustrative only and are not exhaustive of the manners of embodying the present invention. Furthermore, it is to be understood that other embodiments may be utilized as structural changes may be made without departing from the scope of the present invention For example, it will be recognized by those skilled in the art that the present invention may be readily adapted to sending data to a wireless processor or computing device communicating on a wireless communication network in addition to a wireless telecommunication device. It will also be recognized by those skilled in the art that a wireless device or a device connected to a public switched telephone network (PSTN) may act as a message originating entity. Likewise, either a wireless device or a device connected to a PSTN may act as a message receiving entity.

Figure 1:
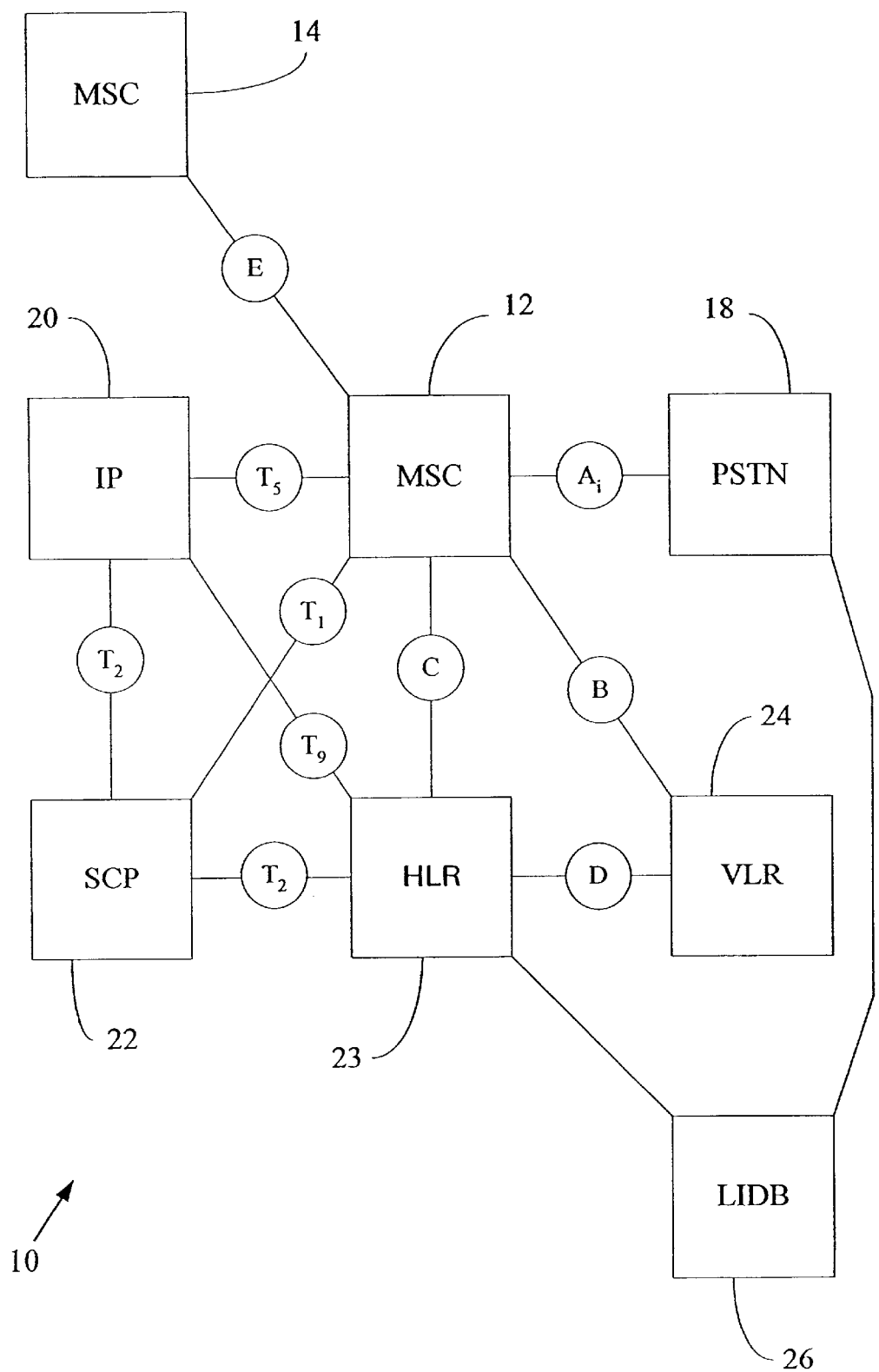
FIG. 1 is a schematic diagram of a model wireless network.

Referring now to the drawings for the purposes of illustrating the present preferred embodiments of the invention only and not for the purposes of limiting the same, FIG. 1 illustrates an example of a wireless network 10 having interconnected network entities. That network reference model 10 appears in Chapter-1 (or Part-1) of revision-D of the IS-41 wireless intersystem operation standard. Revision-D of the IS-41 standard is incorporated herein by reference in its entirety. Copies of current and previous revisions of the IS-41 standard may be obtained from Global Engineering Documents, 15 Inverness Way East, Sales-C303B, Englewood, Colo., USA 80112-9649. FIG. 1 and a description of the network entities depicted therein and their interaction are included herein as a general overview of a standard wireless network. The present invention does not necessarily utilize every network entity depicted in FIG. 1 and, furthermore, may utilize additional entities not depicted in FIG. 1.

The IS-41 standard is more recently referred to as a TIA/EIA-41 standard, where "TIA" stands for Telecommunications Industry Association and "EIA" stands for Electronics Industry Association. However, the following discussion uses the designations IS-41 and TIA/EIA-41 interchangeably. Although the discussion herein focuses on IS-41 messages to accomplish wireless schedule notification, it will be understood by one skilled in the art that the methodology described herein may be implemented with other non-IS-41 messages having functionality similar to that described hereinbelow.

It is known in the art that IS-41 is the technical standard that specifies the network model, functions, protocols, and services that provide mobile telecommunications networks intersystem operations. The IS-41 specification also provides a standard protocol for the operations that enable subscriber mobility between two mobile switching centers (MSCs) in a single wireless network or in two different wireless networks operated by a single or two different service providers. Protocols used to communicate between a wireless device and another device are also known. In other words, the IS-41 standard specifies the necessary signaling mechanism to accomplish seamless communication in the mobile world. Following is a brief description of each of the network entities illustrated in FIG. 1.

The network entities depicted in FIG. 1 include an anchor MSC 12, a visiting (or serving) MSC 14, PSTN 18, an intelligent peripheral (IP) 20, a service control point (SCP) 22, a home location register (HLR) 23, a visitor location register (VLR) 24, and a line information database (LIDB) 26. These network entities represent functional blocks or units that perform various logical functions that are implementation-independent. In other words, one or more of the above-mentioned network entities may be constructed in different physical configurations by different mobile service providers and, hence, the model shown in FIG. 1 is a symbolic representation of functions that may be included on a wireless network and does not imply either a specific physical implementation of a network entity shown therein or a specific interconnection between two or more network entities shown therein. For example, the discussion below identifies the VLR 24 as associated with the anchor MSC 12 as well as with the serving MSC 14. The diagram in FIG. 1, however, does not show a direct physical interconnection between the VLR 24 and the serving MSC 14. The sharing of the VLR 24 may be possible when a common service provider operates both of the mobile switching centers 12 and 14, for example.

It is therefore emphasized that the arrangement shown in FIG. 1 is for illustration only. The network entities shown in FIG. 1 may not represent an actual physical connection, especially when call-routing involves many more cells and, hence, many more network entities, in a wireless network. For example, in one embodiment that is not illustrated in the Figures, the serving MSC 14 may have its own HLR and VLR and may be maintained by a service provider that is different from the service provider maintaining the anchor MSC 12 and its associated network entities. A service provider may furthermore choose not to provide all the network entities or all the interconnections illustrated in FIG. 1 in a given geographic area or cell. In addition, more than one functional unit may be implemented on a single physical device, or, alternatively, some functional blocks may represent separate physical devices. For example, one physical device may include the functionality of the IP 20, HLR 23, and the SCP 22.

Each network entity is shown interconnected via interfaces represented by different interface reference points. For example, the anchor MSC 12 and the visiting (or serving) MSC 14 are shown connected via the interface reference point E, and the anchor MSC 12 and its associated HLR 23 are shown connected via the interface reference point C. Other interface reference points are also illustrated in FIG. 1. These interface reference points represent the point of connection between two physical or logical network entities. A point of connection is defined by functional and signaling characteristics and may define the operational responsibility of the interconnected network entities. Thus, the signaling characteristic of the B interface may be different from that of the $T_1$ interface, and the signaling characteristic of the C interface may be different from that of the D interface, etc.

It is noted that the terms "mobile subscriber," "network subscriber" and "mobile user" are used interchangeably hereinbelow. A "mobile subscriber" (not shown) may be a human individual who has subscribed to one or more mobile wireless services. The term "mobile subscriber," as used herein, also includes a mobile service user who uses the subscribed wireless service(s) with a mobile telephone handset or with a computer equipped for wireless communication or with any other similar device. Further, "mobile communication" may include voice, data or any other information communicated via a mobile telecommunications network.

The MSC is a functional entity that represents an automatic wireless message switching system. An MSC may be distinguished from a mobile telephone switching office, which refers to a physical wireless switching office including switching hardware, the physical building, the MSC, and the like. An MSC is typically an interface for user traffic between a cellular network, PSTNs or other MSCs in the same or other networks. An MSC provides basic switching functions and coordinates the establishment of calls to and from cellular subscribers. Thus, an MSC is responsible for various call processing as well as mobile subscriber mobility management functions.

An MSC first receiving a call placed by a caller calling a mobile subscriber may be referred to as the "anchor MSC" (e.g., MSC 12), whereas an MSC that completes the call by delivering the call to the mobile subscriber may be referred to as the "serving MSC" (e.g., MSC 14). The geographic locations of the caller and the mobile subscriber at the time of call reception determines whether the anchor MSC 12 and the serving MSC 14 are the same or different.

The PSTN 18 may include a wire line telephone network carrying a call from an external network caller to a mobile subscriber or vice versa. The $A_i$ interface represents an interconnection between the PSTN 18 and a switching center in the mobile network, here, the MSC 12. The PSTN 18 may include a digitally switched telephone network, a plain old telephone system (POTS), the Internet or other external networks, including a local area network (LAN), a wide area network (WAN) and another mobile network. It is known that mobile networks are capable of interoperating with other networks (e.g., PSTN 18) to complete calls.

The IP 20 is a network entity that may be a server or any other database capable of storing data including caller-specific information stored in "mailboxes" and messages received from or to be forwarded to a mobile subscriber, for example. The IP 20 also includes a processor that interprets instructions, which may, for example, be included in the message or received from other network nodes and then executes those instructions. In one embodiment, the IP 20 is part of the HLR 23. In another embodiment, a single server performs the storage function that may be performed by the IP 20 and the switching function that may be performed by the MSC 12. Alternatively, the IP 20 may be an independent physical entity in the wireless network. The IP 20 may also be able to perform multiple activities (e.g., activities similar to hose performed by the SCP 22).

Interim Standard-41 (IS-41) for mobile telecommunications includes a Short Message Service (SMS), which is a wireless communication data service that is typically resident in the IP 20. Common communication protocols such as, for example, a standard pager protocol, the Internet protocol TCP/IP, and Simple Mail Transfer Protocol (SMTP) may furthermore be utilized to communicate information to and from the SMS. It should be noted, however, that a facility for converting messages conforming to certain protocols may be necessary to convert the data to an SMS readable format. An SMS is a messaging service that provides store-and-forward functions for the handling of short messages directed to or originating from the mobile subscribers. Thus, the SMS is able to store data and deliver that data to a wireless communication device at a specified time. The SMS also has the capacity to compare an address and sub-address received with a message to an address and sub-address of a previously received and stored message and to replace the stored message with the new message or delete the store message when the addresses and sub-addresses match. In its most basic form, the SMS functions in conjunction with an originating Short Message Entity (SME) and a receiving SME. The originating and sending SMEs may be wireless communication devices. Because the SMS is also compatible with packet-switched networks, electronic mail services, paging services and other commonly used messaging services, however, one or both of the SMEs may alternately be a processor, a personal computer, or another device that utilizes those messaging services.

A cellular wireless network may interconnect with a Signaling System No. 7 (SS7) network as a backbone network to transport IS-41 signaling messages through the mobile telecommunications network. SS7 packets may be used to convey signaling information from an originating point to a destination point through multiple switching nodes in the mobile network, which may encompass more than one wireless network operated by one or more service provider. SS7-based transactions may query databases and invoke functions at remote points throughout the mobile wireless network to establish and maintain calls and to perform reliable call management functions. An SS7 backbone network may be owned and operated by the same service provider that operates the interconnected wireless network. Alternatively, a wireless service provider may join an independent SS7 network provider to accomplish desired call routing, for example. An SCP, for example SCP 22, is an end signaling point in an SS7 network that performs transaction processing of remote operations. The SCP 22 may support a database to perform the required operations, e.g., processing of calling card information. As previously noted, the HLR 23 may perform as an SCP in a given wireless network configuration.

The location registers (e.g., the HLR 23 and the VLR 24) are data-based systems that assist in controlling mobile subscriber services and contain the records and stored information related to mobile subscribers of a particular mobile service provider. The location registers arc queried by other network entities to obtain the current status, location, and other information to support calls to and from mobile users within the wireless network. Location registers may also contain network address translation information to assist in the routing of calls to the appropriate network destination.

The HLR 23 is typically a primary database repository of subscriber information used to provide control and intelligence in wireless networks. The HLR 23 thus contains a record of subscriber information such as features selected by the subscriber as part of the mobile service plan (e.g., call forwarding, calling name service, and the like), status of the subscriber (e.g., active, inactive, suspended service, etc.), the subscriber's mobile directory number (i.e., the number a calling party has to call to reach the mobile subscriber), information about the current geographic location of the mobile subscriber, and the like. More than one MSC 12 or 14 may share the HLR 23. The HLR 23 is generally managed by the wireless service provider company and represents the "home" database of subscribers who have subscribed to the wireless service in that home area served by the wireless service provider.

The VLR 24 is a database that primarily maintains temporary records associated with individual network subscribers. Thus, the VLR 24 represents a "visitor's" database for mobile subscribers who are being served in a defined local area. A wireless service provider also typically manages the VLR 24. The VLR 24 and the HLR 23 may be managed by the same or by different wireless service providers depending on the current geographic location of the mobile subscriber in the wireless network. The term "visitor" may refer to a mobile subscriber who is being served by one or more systems in the home service area, or a mobile subscriber who is roaming in a non-home, or "visited," service area (i.e., a service area of a service provider that is different from the entity from whom the mobile subscriber purchases wireless service). The VLR 24 generally contains subscriber location, status, and service feature information that is derived from the relevant HLR, here, the HLR 23. The serving MSC 14 may access its associated VLR 24 to retrieve information therefrom for the handling of calls to and from visiting subscribers. Similar to the HLR 23, the VLR 24 may also serve one or more MSCs.

Each telecommunications service provider as part of its subscriber account management typically maintains the LIDB database 26. The LIDB database 26 may store caller-specific information (also interchangeably referred to herein as "calling name information"), such as the name of the caller, the telephone number of the caller, and the like. The LIDB database 26 may be used when a call sent to a mobile subscriber involves the PSTN 18 as part of the call connection process, for example. Thus, the calling party information may be placed in the LIDB database 26 when a call is placed from the PSTN 18 to the wireless network. The external network, typically the PSTN 18, may store the calling name information in the LIDB database 26 for a number of reasons including, for example, to validate an identity of the caller in the case of collect calls or third party calls.

Figure 2:
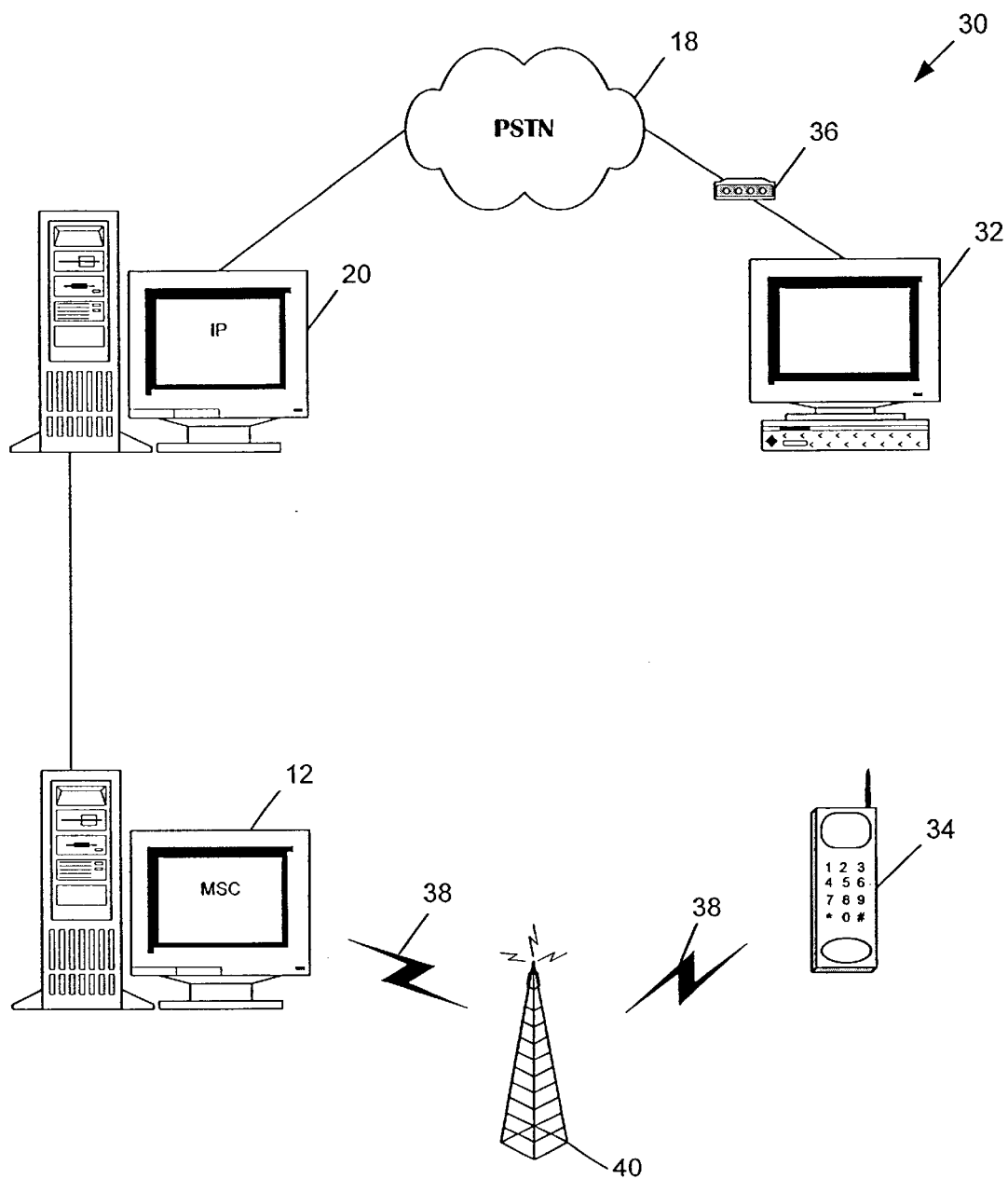
FIG. 2 is a schematic diagram illustrating a communication network connecting a processor to a wireless device.

FIG. 2 is a diagram illustrating a system 30 of the present invention for providing data related to a scheduled event and resident in a message originating entity 32 to a message receiving entity 34. In the embodiment illustrated, the message originating entity 32 communicates with an intelligent peripheral (IP) 20 through a PSTN 18 by way of, for example, a modem 36. The IP 20, in turn, communicates with a message receiving entity 34 through one or more mobile switching centers (MSCs) 12 and a wireless transmission signal 38. Alternatively, a single server may perform the functions of the IP 20 and the MSC 12. As illustrated, one or more relay stations 40 may be utilized to carry the wireless transmission signal 38.

The message originating entity 32 may include a processor and may be, for example, a personal computer having a data storage device and a processor. The message originating entity 32 may, furthermore, run a scheduling program, such as a commercially available scheduling program that stores data related to one or more scheduled events and the scheduled time of each event. The data storage device may, for example, be a magnetic storage device, a random access memory device (RAM) or a read only memory device (ROM). The IP 20 may include a short message service (SMS) that stores and forwards messages. The IP 20 may furthermore conform to an operational standard such as the IS-41 SMS standard. The message receiving entity 34 may be a wireless communication device such as, for example, a digital or analog cellular telephone that is capable of communicating with the MSC 12.

In one embodiment, the schedule notification system includes a computer program executed by the message originating entity 32 of FIG. 2. The computer program retrieves data related to a scheduled event from a schedule program that is also executed by the message originating entity 32 of FIG. 2, determines whether the retrieved data includes data that should be transferred to the message receiving entity 34 illustrated in FIG. 2, formats data to be transferred, and transfers the formatted data to the message receiving entity 34.

Figure 3:
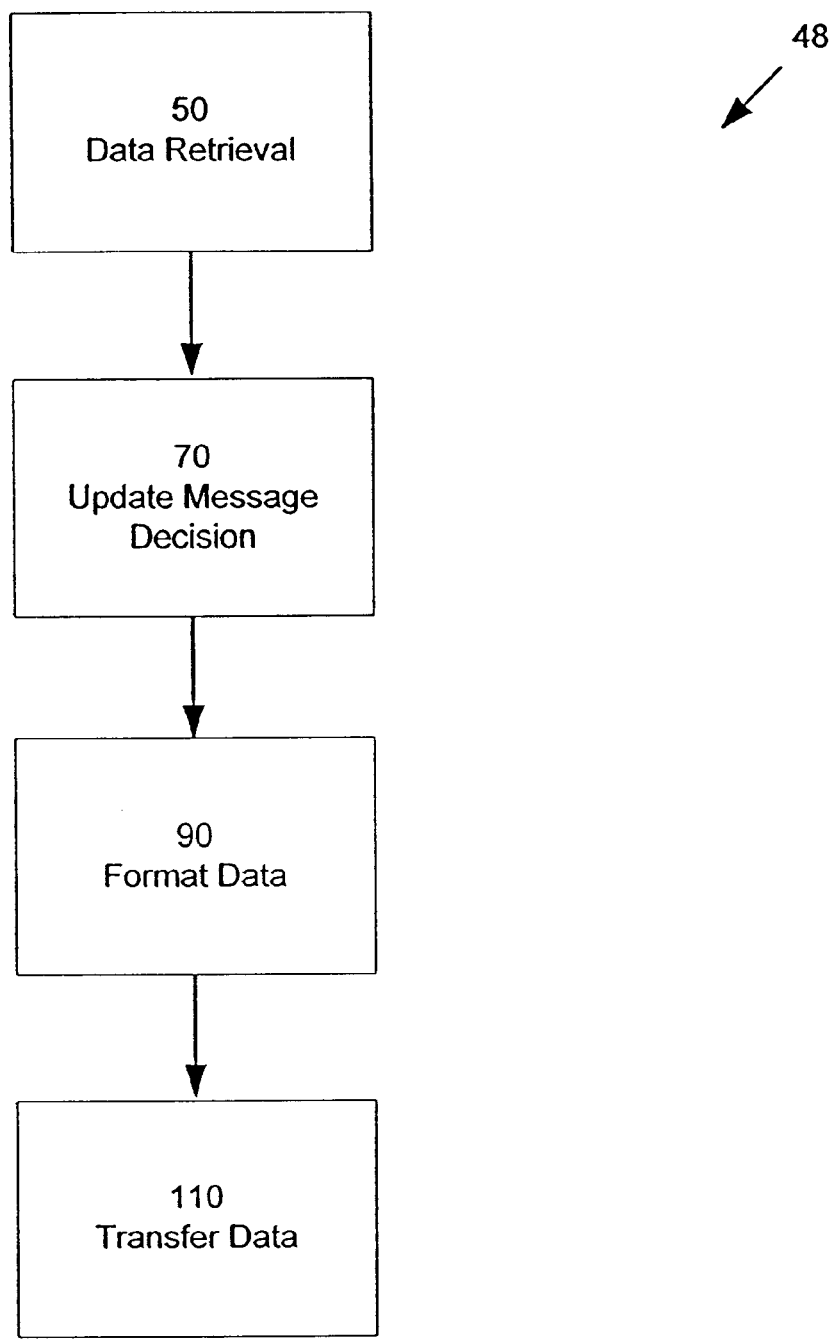
FIG. 3 is a flow diagram illustrating a wireless schedule notification system.

FIG. 3 is a flow diagram illustrating an embodiment of a schedule notification process flow 48 of the present invention. The schedule notification process flow 48 includes data retrieval 50, an update message decision 70, data formatting 90, and transferring data 110 to at least one message receiving entity 34. When the data retrieval step 50 is performed, the data is retrieved from the data storage device of the message originating entity 32. During the update message decision step 70, a decision is made as to whether a message or a queue of messages to be sent to the message receiving entity 34 is to be updated because a message currently stored in a queue of messages to be sent in the future to the message receiving entity 34 has been modified, a new message is to be added to the queue, or an existing message is to be removed from the queue, for example. If the message queue needs to be updated, the data to be sent is formatted as described below at format data step 90. At transfer data step 110, the formatted data is forwarded to the message receiving entity 34 either directly or through a store-and-forward facility such as, for example, the SMS of the IP 20 of FIG. 2. The formatted data may alternately be stored at, for example, the message originating entity 32 for delivery to the message receiving entity 34 at a predetermined time prior to a scheduled time of occurrence of an event.

In one embodiment of the present invention the schedule notification process can be executed by the message originating entity 32 as a background process. For example, the schedule notification process can be executed as a background process on a user's general-purpose computer (e.g., a personal computer, processor and the like). Furthermore, the general-purpose computer can be programmed such that the background process executes instructions at a predetermined time in order to monitor for new or modified schedule data. For example, the background process can wake up the general-purpose computer at predetermined times or intervals and check for new or changed event schedules associated with the schedule data transfer system.

In one embodiment of the present invention, the schedule data transfer system in accordance with the present invention also can execute a set of instructions between the general-purpose computer and the server in order to update existing pending schedule data messages residing on the server. Furthermore, upon initiating a communications session between the general-purpose computer and the server, the general-purpose computer can transfer updated schedule data to the server automatically. The transfer between the general-purpose computer and the server can occur using a network protocol, for example. Further, in one embodiment of the present invention, the network protocol can be of the type that is accepted by a firewall that may be associated with the server. It will be appreciated by those skilled in the art, that a firewall is generally well known as a combination of hardware and software, which limits the exposure of one or more computers interconnected as a network from a hostile attack from outside the network.

In one embodiment of the present invention, the schedule data transfer system can be configured so that the server actually originates schedule data alert message. Such schedule data alert messages originated by the server can include future notifications. Accordingly, such schedule data alert messages are queued on the server. Furthermore, such schedule data alert messages originated by the server can generally be modified by a user prior to a predetermined time. For example, the schedule data alert messages will reside on the server until a predetermined scheduled time before being sent to a user (e.g., a subscriber). Until the schedule data alert messages are sent out, the user generally can modify or edit the alert messages in anyway the user requires or chooses. Alternatively, the user may cancel the schedule data alert messages altogether.

It will be appreciated by those skilled in the art that the schedule data transfer system in accordance with the present invention can transfer the schedule data alert messages from the general-purpose computer to the message receiving entity 34 such as a wireless communications device. Furthermore, the schedule data transfer system can transfer the schedule data alert messages from the server to the message receiving entity 34 such as a wireless communication device.

Figure 4:
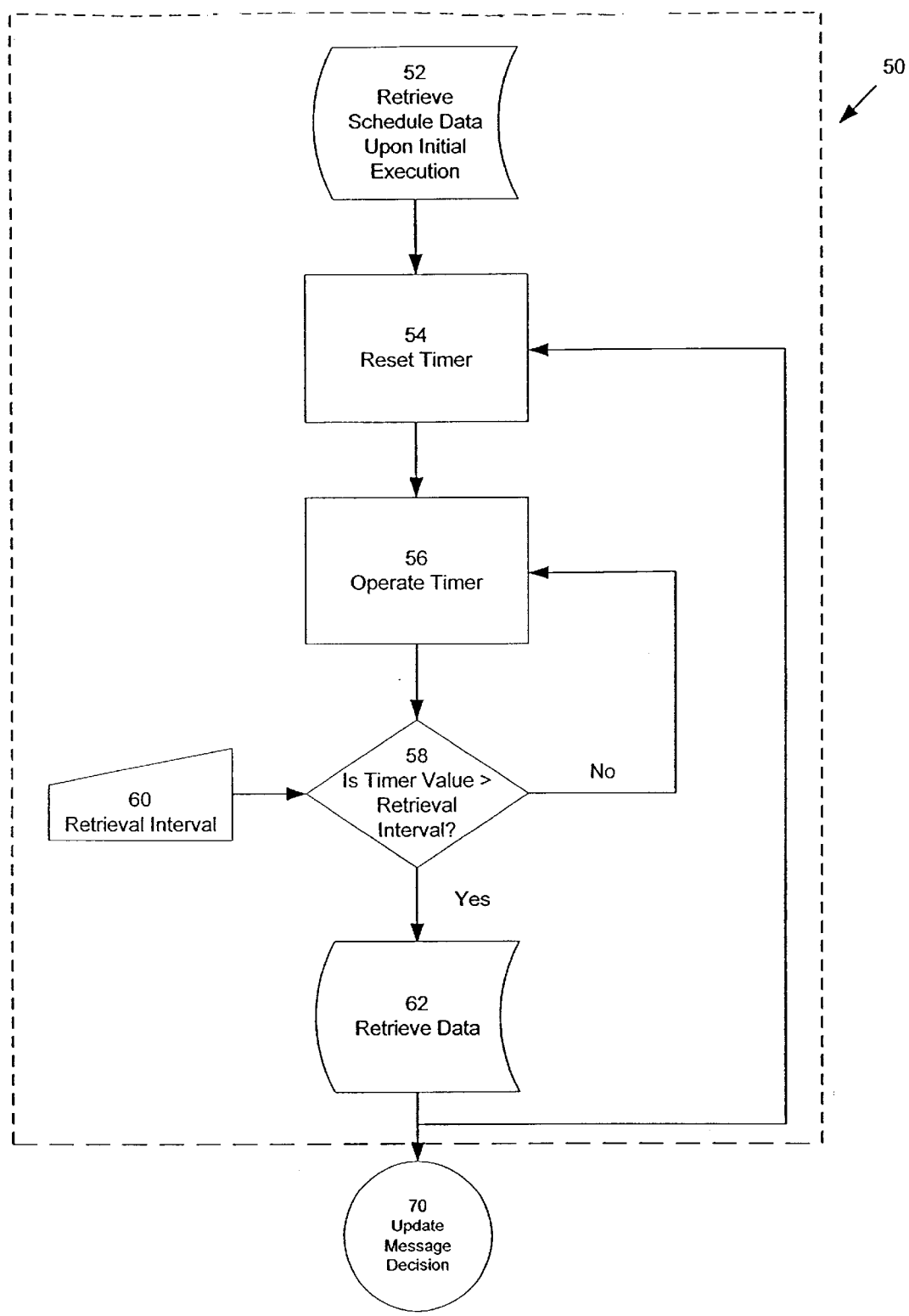
FIG. 4 is a flow diagram illustrating a data retrieval process flow of the schedule notification system of FIG. 3.

FIG. 4 is a diagram illustrating an embodiment of the data retrieval process flow 50 of FIG. 3. The data retrieval process flow 50 of this embodiment may retrieve schedule data from the data storage device of the message originating entity 32 of FIG. 2, for example. Data may be retrieved when executing a computer program embodying the invention first performs the method, and again each time a retrieval time interval 60 elapses thereafter, for example. The retrieval interval 60 may be determined in many ways including, for example, by reading a user selectable input or by utilizing a default value determined by the schedule notification process flow 48. The retrieval interval 60 may furthermore be a period such as two minutes, for example. At step 52, the schedule notification process flow 48 retrieves schedule data when the schedule notification system is first executed by the message originating entity 32. At step 54, the schedule notification process flow 48 resets a timer to indicate that no time has elapsed since the schedule data was last retrieved. At step 56, the schedule notification process flow 48 operates the timer to track the amount of time that has elapsed since the timer was last reset, and at step 58, the schedule notification process flow 48 compares the elapsed time since the schedule data was last retrieved to the retrieval time interval 60. If the elapsed time does not exceed the user selectable retrieval time interval 60, the schedule notification process flow 48 will again operate the timer and will not retrieve scheduled data. At step 62, if the elapsed time exceeds the retrieval interval 60, the schedule notification process flow 48 will retrieve scheduled data once again.

Timer operation may be accomplished in any way known including incrementing a time accumulator or reading from a clock and comparing the present time to the time when schedule data was last retrieved, for example. After scheduled data has been retrieved, the schedule notification process flow 48 will reset the timer at step 54 and restart the timer operation and data retrieval sequence of steps 56, 58 and 62 such that data is retrieved each time the retrieval interval 60 elapses. Each time data is retrieved, the data is sent to the update message decision step 70 of the schedule notification process flow 48 where a determination is made as to whether data to be sent to the message receiving entity 34 should be updated.

When retrieving schedule data, the schedule notification process flow 48 may search directly from a database or may interface with a schedule system through an application system interface designed into the schedule program for such access, for example. The data that is retrieved and sent can be any data related to a scheduled event including, for example appointment related information such as a time when a meeting is to take place, who the meeting is with, where the meeting will take place, directions to the meeting place, and any other data that might be beneficial to have on hand prior to a meeting. Alternatively, the event-related data may simply include the time at which an appointment is scheduled or may remind the user of a holiday or a day of personal importance such as a birthday or wedding anniversary of a friend, for example.

Figure 5:
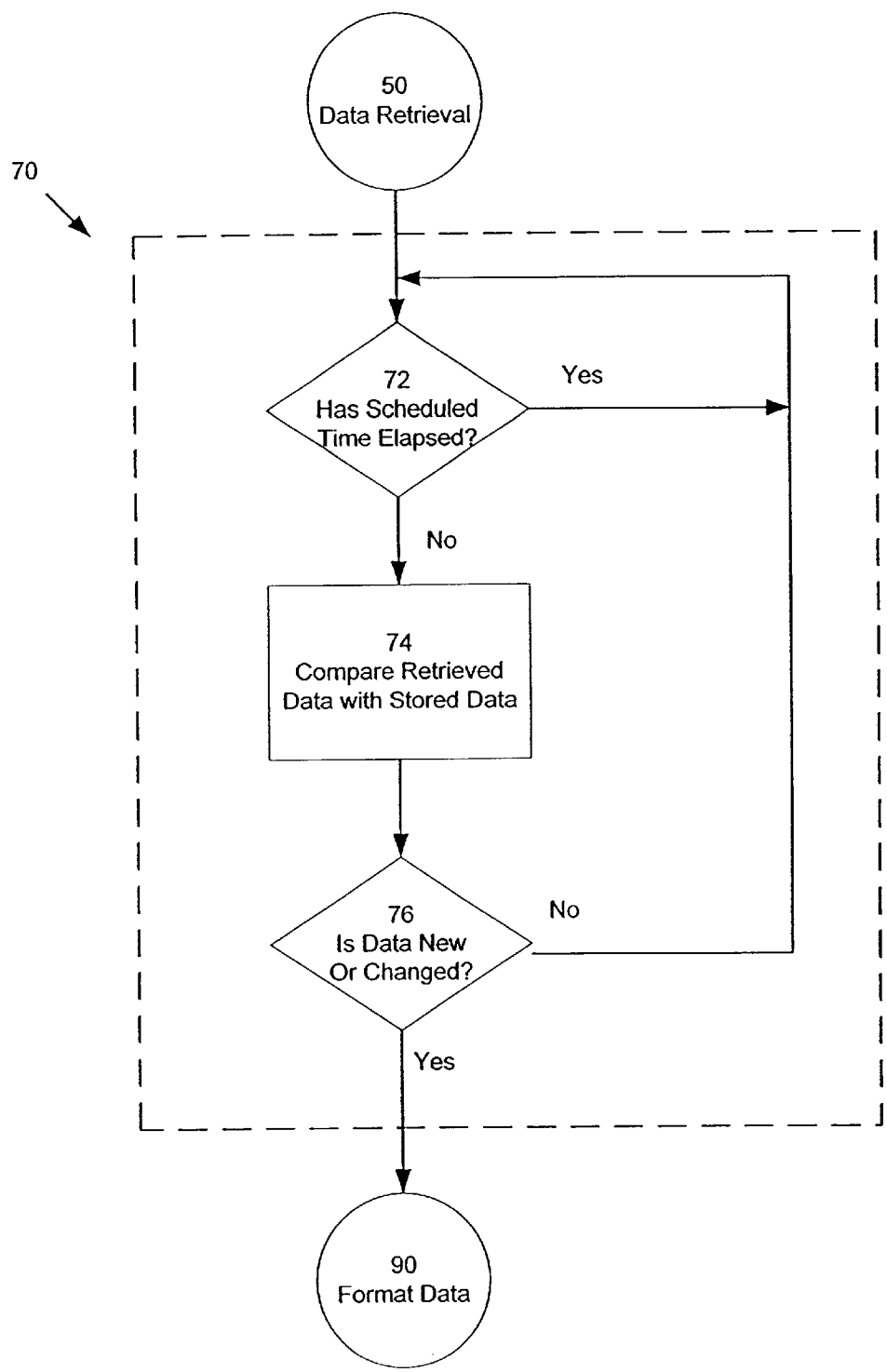
FIG. 5 is a flow diagram illustrating an update message decision process flow of the schedule notification system of FIG. 3.

FIG. 5 illustrates an embodiment of the update message decision process flow 70 of FIG. 3. The update message decision determines whether an updated message should be stored for delivery to the message receiving entity 34. Certain users may choose not to have the system forward data related to events having scheduled times that have already passed because that data is no longer of use. Therefore, at step 72 the scheduled time associated with each scheduled event may be compared to the current time to determine whether the scheduled time has elapsed. If the scheduled time for a particular event has passed, all information related to that event may be disregarded and only those events having scheduled times that are in the future may be further processed.

At step 74, the retrieved data is compared to the previously retrieved data. At step 76, the most recent schedule data is compared with previously received data to determine whether any of the data is new. If any data is new, that data will be forwarded to the data formatting portion of the system for forwarding to the message receiving entity 34. In addition, at step 76, the schedule data is compared with previously received data to determine whether any of the data related to an existing scheduled event has been modified.

For example, if the scheduled time of the event that was previously read by the present invention has been modified or data related to that event has been modified, the schedule notification process flow 48 may replace the old data with the new data and forward the modified data to the formatting portion of the system for forwarding to the message receiving entity 34. Alternatively, if any event that is scheduled to be forwarded to the message receiving entity 34 is deleted, the schedule notification process flow 48 may recognize that modification and delete a previously prepared record so that no message related to that event will be forwarded to the message receiving entity 34.

Figure 6:
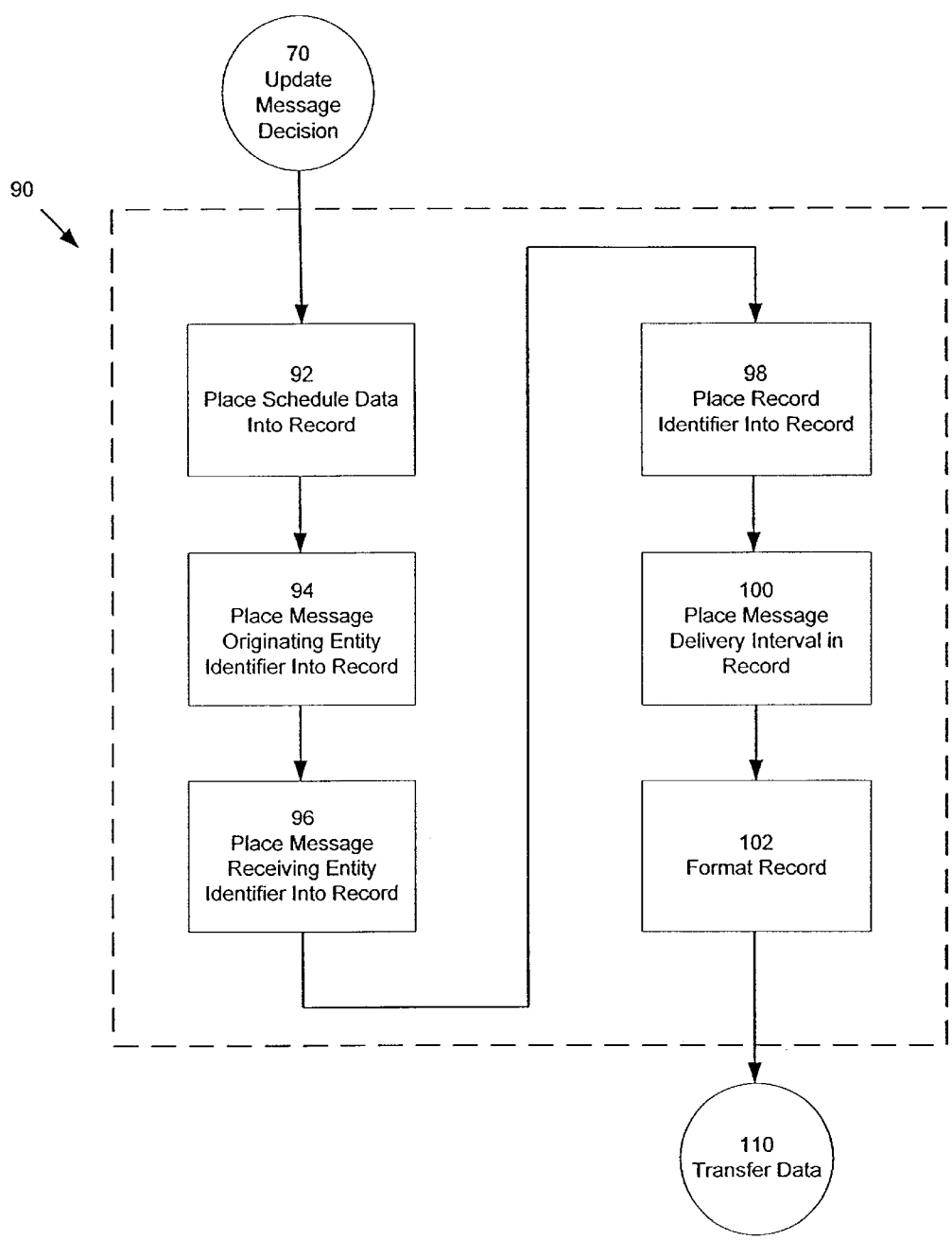
FIG. 6 is a flow diagram illustrating a message formatting process flow of the schedule notification system of FIG. 3.

FIG. 6 illustrates an embodiment of a data formatting process flow 90 of FIG. 3. All data relating to a single scheduled event may be placed in an event record. Each event record may include, for example, pertinent data retrieved from the schedule program, a message originating entity identifier, a message retrieving entity identifier, a record identifier, and information related to the time when the message is to be delivered to the message receiving entity 34. Other identifiers may also be placed within the record. Those other identifiers may, for example, identify data, equipment utilized in transferring the message, and data storage addresses, for example in the SMS. At step 92, data retrieved from the schedule program is placed into the record. At step 94, a message originating entity identifier is placed in the record to identify the message originating entity 32 from which the message originated. At step 96, a message receiving entity identifier is placed in the record to identify the message receiving entity 34 to which the message is being sent. At step 98, a discrete record identifier is placed in the record to identify that record so that that record may, for example, be modified or deleted. The time that the message is to be delivered to the message receiving entity 34 may be communicated through the record in a variety of ways including, for example, by placing the time that delivery is to be made in the record, placing an amount of time in the future that the message should be delivered to the message receiving entity 34 in the record, or placing a period of time prior to the scheduled event time that the message should be delivered to the message receiving entity 34 in the record. Moreover, FIG. 6 illustrates an embodiment wherein a user selectable message delivery interval, representing a period of time prior to the scheduled occurrence of the event when the message receiving entity 34 is to be notified of the scheduled event, is input into the record at step 100. For example, if an event is scheduled to take place at 3:00 P.M. on Jan. 1, 2000, and the message delivery interval is set at 15 minutes, data related to the scheduled event will be transferred to the message receiving entity 34 at 2:45 P.M. on Jan. 1, 2000. The message delivery interval may, furthermore, be any period of time from seconds to days or even years prior to the scheduled time of the event. The message delivery interval may be individually settable for each message transferred, may be a default interval set in the schedule notification process flow 48, or may be a combination of a message specific interval and a default interval that takes effect when a message specific delivery interval is not set.

After all necessary information has been placed in the record, the record is placed in a standard format at step 102. The format may conform to an e-mail or paging standard, for example. Where, for example, a message is to be sent to an SMS in an e-mail format, it may be beneficial to provide an e-mail server either integrated into the IP 20 or hosted in a processor (not shown) separate from the IP 20 to convert the record from the e-mail format to a format that is readily recognized by the SMS.

At step 110 in FIG. 3, the formatted message is then transferred to the SMS at the IP 20 for delivery to the message receiving entity 34. The message may be sent to the SMS at the scheduled time for immediate delivery to the message receiving entity 34, for example.

Alternatively, because the SMS is capable of storing data and forwarding that data to a message receiving entity 34 at a specified time, records may be sent to the SMS upon creation and stored in a storage device at the SMS until the specified delivery time. At the specified delivery time, the SMS will transfer the stored data to the message receiving entity 34. The SMS is also capable of holding multiple messages to be delivered at various times to one or more receiving entities 34. Furthermore, if operation of the message originating entity 32 running the schedule notification system is terminated from time to time, it is a benefit to transfer messages to the SMS immediately for storage at the SMS and scheduled delivery from the SMS because the SMS will pass messages stored therein whether or not the message originating entity 32 is operating. Additionally, messages stored at the SMS may conveniently be modified or deleted by matching the record identifying information to find the message to be modified.

The message may be provided to the user of the message receiving entity 34 in a variety of ways including providing a sensory output or providing a message by way of the message receiving entity 34, for example. A sensory output may be a vibrating, audible, or visual output that reminds the user that a known event will be occurring, for example. Alternatively, test or graphic message may be displayed on the message receiving entity 34 and may include data such as the scheduled time of the event and other data related to the event, for example. Of course a sensory output may be used in conjunction with a text or graphic display to inform the user that the message is being displayed.

Those of ordinary skill in the art will recognize that many modifications and variations in the details, materials and arrangement of parts which have been herein described and illustrated in order to explain the nature of the invention may be made by the skilled artisan within the principle and scope of the invention as expressed in the appended claims. It is intended that the scope of the invention be limited not with this description, but rather by the claims appended hereto.

What is claimed is:

1. A method of providing data to a wireless device, comprising:

retrieving user defined event related data from a storage device;

retrieving time schedule data associated with the event related data, wherein an event is scheduled to occur at a time represented by the time schedule data; and transferring the event related data to a wireless communication device at a predetermined time prior to the time indicated by the time schedule data.

2. The method of claim 1, wherein the event related data and the time schedule data are stored in a data base in the storage device.

3. The method of claim 1, wherein the event related data and the time schedule data are retrieved from a computer having a storage device and a processor and wherein the computer has stored therein a schedule program.

4. The method of claim 1, further comprising retrieving data identifying the message originating entity.

5. The method of claim 1, further comprising retrieving data identifying the message receiving entity.

6. The method of claim 1, further comprising retrieving the event related data and the time schedule data when the method is first performed.

7. The method of claim 1, further comprising retrieving the event related data and the time schedule data each time a predetermined time interval elapses.

8. The method of claim 1, further comprising comparing retrieved event related data and time related data to previously retrieved event related data and time related data.

9. The method of claim 1, further comprising determining whether the scheduled time that the event is to occur has passed.

10. The method of claim 1, further comprising determining whether the retrieved event related data should be transferred to the wireless communication device.

11. The method of claim 1, further comprising formatting the retrieved event related data.

12. The method of claim 1, wherein the transferred event related data data includes at least a portion of the retrieved event related data.

13. The method of claim 1, further comprising formatting the retrieved event related data as a record prior to transferring the event related data.

14. The method of claim 13, further comprising assigning a record identifier to the record.

15. The method of claim 13, further comprising adding a message delivery interval to the record.

16. The method of claim 13, further comprising adding a message originating entity identifier to the record.

17. The method of claim 13, further comprising transferring the retrieved event related data by way of a short message service.

18. The method of claim 17, further comprising formatting the record in an e-mail format.

19. The method of claim 18, further comprising converting the record from the e-mail format to a format recognized by a short message service.

20. The method of claim 17, wherein the transferring occurs when the retrieved event related data does not match previously retrieved data.

21. The method of claim 13, wherein the formatting includes formatting the record in an internet protocol format.

22. The method of claim 13, wherein the formatting includes formatting the record in a simple mail transfer protocol.

23. A method of providing data related to a scheduled event to a wireless device at a predetermined time prior to the occurrence of that event, comprising:
retrieving user defined event related data from a storage device;
retrieving time schedule data associated with the event related data, wherein an event is scheduled to occur at a time represented by the time schedule data; and
transferring the retrieved event related data to a wireless communication device by way of a short message service at a predetermined time prior to the time indicated by the time schedule data.

24. A method of providing data related to a scheduled event to a wireless device at a predetermined time prior to the occurrence of that event, comprising:
retrieving user defined event related data from a storage device at a predetermined time interval, the data including time schedule data including a time at which an event is scheduled to take place;
comparing the retrieved event related and time schedule data to previously retrieved event related and time schedule data;
formatting the event related and time schedule data; and
transferring the retrieved event related data to a wireless communication device by way of a short message service at a predetermined time prior to the time indicated by the time schedule data at which the event is scheduled to take place.

25. A schedule data transfer system, comprising:
a storage device containing computer readable data representing a scheduled time of an event; and
a processor containing instructions that, when executed by the processor, cause the processor to:
retrieve event related schedule data from the storage device;
retrieve time schedule data associated with a time when the event is scheduled to occur; and
transfer the event related data and the time schedule data to a wireless communication device at a predetermined time prior to the time indicated by the time schedule data.

26. The schedule data transfer system of claim 25, wherein the data includes at least a portion of the retrieved event related schedule data.

27. The schedule data transfer system of claim 25, wherein the event related schedule data includes a predetermined time at which the transfer is to take place.

28. The schedule data transfer system of claim 25, wherein the processor contains further instructions which, when executed by the processor, cause the processor to:
determine whether the retrieved event related schedule data should be transferred to the wireless communication device; and
format the retrieved event related schedule data.

29. The schedule data transfer system of claim 25, further comprising a short message server receiving the event related schedule data from the processor and transferring the event related schedule data to the wireless communication device.

30. The schedule data transfer system of claim 25, wherein the instructions are executed by the processor as a background process.

31. The schedule data transfer system of claim 30, wherein the background process is executed on a general-purpose computer.

32. The schedule data transfer system of claim 30, wherein the background process executes instructions at a predetermined time to monitor for new or modified schedule data.

33. A schedule data transfer system, comprising:
a server;
a computer readable medium containing user defined event related schedule data and time schedule data associated with a time when the event is scheduled to occur;
a processor communicating with the server and the computer readable medium and containing instructions that, when executed, cause the processor to transfer the event related schedule and time schedule data to the server; and
a wireless communication device in communication with the server, whereby the wireless communication device receives the event related schedule data from the server at a predetermined time that is prior to the time indicated by the time schedule data.

34. The schedule data transfer system of claim 33, wherein a set of instructions are executed between the processor and the server to update existing pending event related schedule data messages residing on the server.

35. The schedule data transfer system of claim 33, wherein, upon initiating a communications session between the processor and the server, the processor transfers updated event related schedule data to the server.

36. The schedule data transfer system of claim 35, wherein the data is transferred between the processor and the server occurs using a network protocol.

37. The schedule data transfer system of claim 36, wherein the network protocol is accepted by a firewall associated with the server.

38. The schedule data transfer system of claim 33, wherein the server originates event related schedule data alert messages.

39. The schedule data transfer system of claim 38, wherein the event related schedule data alert messages further comprise future notifications.

40. The schedule data transfer system of claim 38, wherein the event related schedule data alert messages are queued on the server.

41. The schedule data transfer system of claim 38, wherein the event related schedule data alert messages can be modified by a user prior to a predetermined time.

42. The schedule data transfer system of claim 38, wherein the event related schedule data alert messages are transferred from the server to the processor at a predetermined time.

43. The schedule data transfer system of claim 42, wherein the event related schedule data alert messages are transferred from the processor to the wireless communications device.

44. The schedule data transfer system of claim 38, wherein the event related schedule data alert messages are transferred from the server to the wireless communication device.

45. The schedule data transfer system of claim 33, wherein the data transferred to the server includes at least a portion of the event related schedule data contained by the computer readable medium.

46. The schedule data transfer system of claim 33, wherein the time schedule data includes a time at which an event is scheduled to take place and the data is transferred to the wireless communication device at a predetermined time prior to the time at which the event is scheduled to take place.

47. The schedule data transfer system of claim 33, wherein the server is a short message server.

48. The schedule data transfer system of claim 33, wherein the server includes an intelligent peripheral and a mobile switching center.

49. A computer readable medium having stored thereon instructions which, when executed by a processor, cause the processor to:

retrieve user defined event related schedule data from a storage device, the data including a time at which an event is scheduled to take place;

retrieve time schedule data associated with a time when the event is scheduled to occur; and transfer at least a portion of the event related schedule data to a wireless communication device at a predetermined time prior to the time indicated by the time schedule data at which the event is scheduled to take place.

* * * * *